(12) United States Patent
Brick et al.

(10) Patent No.: US 6,269,342 B1
(45) Date of Patent: Jul. 31, 2001

(54) PROGRAMMABLE SHELF TAG SYSTEM

(75) Inventors: Frank E. Brick, The Woodlands, TX (US); Jeffrey W. Sutherland, Mogadore, OH (US)

(73) Assignee: Telxon Corporation, Akron, OH (US)

( * ) Notice: Subject to any disclaimer, the term of this patent is extended or adjusted under 35 U.S.C. 154(b) by 0 days.

(21) Appl. No.: 09/045,012

(22) Filed: Mar. 20, 1998

Related U.S. Application Data

(63) Continuation-in-part of application No. 08/430,350, filed on Apr. 28, 1995, now Pat. No. 5,751,257.

(51) Int. Cl.$^7$ .................................................. G06F 17/60
(52) U.S. Cl. ............................... 705/20; 705/21; 235/383
(58) Field of Search ............................ 705/20, 21, 22, 705/28, 29; 235/383

(56) References Cited

U.S. PATENT DOCUMENTS

| | | | |
|---|---|---|---|
| 4,002,886 | * 1/1977 | Sundelin | 235/61.7 R |
| 4,291,304 | 9/1981 | Walter | 340/715 |
| 4,500,880 | * 2/1985 | Gomersall et al. | 340/825.35 |
| 4,766,295 | * 8/1988 | Davis et al. | 235/383 |
| 4,870,398 | 9/1989 | Bos . | |
| 4,901,066 | 2/1990 | Kobayashi et al. . | |
| 4,908,613 | 3/1990 | Green . | |
| 4,916,441 | 4/1990 | Gombrich . | |
| 4,948,232 | 8/1990 | Lange | 350/334 |
| 5,019,811 | 5/1991 | Olsson et al. . | |
| 5,111,196 | * 5/1992 | Hunt | 340/825.35 |
| 5,172,314 | * 12/1992 | Poland et al. | 364/401 |
| 5,216,233 | * 6/1993 | Main et al. | 235/472 |
| 5,241,467 | * 8/1993 | Failing et al. | 364/401 |
| 5,245,534 | * 9/1993 | Waterhouse et al. | 364/404 |
| 5,250,789 | 10/1993 | Johnsen | 235/383 |
| 5,251,048 | 10/1993 | Doane et al. . | |
| 5,295,064 | 3/1994 | Malec et al. | 340/825.35 |
| 5,296,953 | 3/1994 | Kanbe et al. . | |
| 5,313,569 | 5/1994 | Olsson et al. . | |
| 5,345,071 | 9/1994 | Dumont . | |
| 5,374,815 | * 12/1994 | Waterhouse et al. | 235/383 |
| 5,380,991 | 1/1995 | Valencia et al. | 235/383 |
| 5,448,046 | * 9/1995 | Swartz | 235/432 |

(List continued on next page.)

FOREIGN PATENT DOCUMENTS

WO94/11832 * 5/1994 (WO) .
WO95/25300 * 9/1995 (WO) .

OTHER PUBLICATIONS

"Pricer AB and Telxon Corporation to Cooperate in Technology Development and Marketing," PR Newswire, Jan. 1997.*

"Telxon Announces Strategic Alliance in Electronic Shelf Labeling and Pricing Systems," PR Newswire, Jan. 1997.*

(List continued on next page.)

Primary Examiner—Tariq R. Hafiz
Assistant Examiner—Susanna Meinecke-Díaz
(74) Attorney, Agent, or Firm—Renner, Otto, Boisselle & Sklar, LLP

(57) ABSTRACT

An electronic pricing and display system using programmable electronic shelf tags. Programmable electronic shelf tags are used in connection with apparatus for programming the electronic shelf tags. Pricing and product information is stored in databases of a computer system for such purposes as inventory control and updating pricing information. A portable programming device is used to transmit programming data Methods are provided for fast and convenient modification of large numbers of electronic shelf tags located throughout a facility (e.g., a retail store).

15 Claims, 10 Drawing Sheets

U.S. PATENT DOCUMENTS

| | | | |
|---|---|---|---|
| 5,448,226 | * | 9/1995 | Failing, Jr. et al. ............ 340/825.35 |
| 5,457,307 | * | 10/1995 | Dumont ................................ 235/383 |
| 5,461,561 | * | 10/1995 | Ackerman et al. .................. 364/401 |
| 5,465,085 | * | 11/1995 | Caldwell et al. ............... 340/825.35 |
| 5,473,146 | * | 12/1995 | Goodwin, III ....................... 235/383 |
| 5,506,600 | | 4/1996 | Ooki et al. . |
| 5,532,465 | * | 7/1996 | Waterhouse et al. ................ 235/383 |
| 5,570,216 | | 10/1996 | Lu et al. .............................. 359/101 |
| 5,583,487 | * | 12/1996 | Ackerman et al. ............ 340/825.35 |
| 5,704,049 | * | 12/1997 | Breichle ............................... 395/326 |
| 5,729,695 | * | 3/1998 | Ahlm et al. .......................... 395/220 |
| 5,729,696 | * | 3/1998 | Goodwin, III et al. ............. 395/222 |
| 5,736,967 | | 4/1998 | Kayser et al. . |
| 5,751,257 | * | 5/1998 | Sutherland .............................. 345/2 |
| 5,758,064 | * | 5/1998 | Zimmerman et al. .......... 395/183.19 |
| 5,771,005 | * | 6/1998 | Goodwin, III .................. 340/825.35 |
| 5,794,211 | * | 8/1998 | Goodwin, III et al. ............... 705/23 |
| 5,794,215 | * | 8/1998 | Goodwin, III ......................... 705/26 |
| 5,797,132 | * | 8/1998 | Altwasser .............................. 705/16 |
| 5,812,985 | * | 9/1998 | Failing et al. ........................... 705/5 |
| 5,839,116 | * | 11/1998 | Goodwin, III ......................... 705/20 |
| 5,870,714 | * | 2/1999 | Shetty et al. ........................... 705/20 |
| 5,880,449 | | 3/1999 | Teicher et al. . |
| 5,898,383 | | 4/1999 | Forsythe . |
| 5,918,212 | * | 6/1999 | Goodwin, III ......................... 705/20 |
| 5,926,797 | * | 7/1999 | Goodwin, III ......................... 705/20 |
| 5,929,770 | * | 7/1999 | Faita ................................ 340/825.35 |
| 5,987,426 | * | 11/1999 | Goodwin, III ......................... 705/21 |
| 5,988,498 | | 11/1999 | Hoell .................................... 235/383 |
| 5,999,913 | * | 12/1999 | Goodwin, III ......................... 705/20 |
| 6,009,538 | * | 12/1999 | Goodwin, III et al. ............... 714/25 |
| 6,012,040 | * | 1/2000 | Goodwin, III ......................... 705/20 |
| 6,016,481 | * | 1/2000 | Failing, Jr. et al. ................... 705/28 |
| 6,026,373 | * | 2/2000 | Goodwin, III ......................... 705/20 |

OTHER PUBLICATIONS

"ShelfNet Electronic Shelf Label System," Retrieved from the Internet [URL: http://www.ersi.com] on Apr. 6, 2001.*

"Electronic Retailing Systems International, Inc. is First Electronic Shelf Label Vendor Selected to Support Trial Program in Massachusetts," Business Wire, p. 07091210, Jul. 1998.*

"Pricer/Intactix Opens Doors in Benelux," Business Wire, p. 11060100, Nov. 1997.*

"Operating Stores: High Octane Execution," Chain Store Age Executive with Shopping Center Age, p. MH21, Jan. 1994.*

Riding the Air Waves, Progressive Grocer, vol. 73 n 7, p. 104; Jul. 1994.

Giant Food plans to test rival labeling systems, Supermarket News, vol. 43, n 28, p. 13; Jul. 1993.

Wal–Mart deploys handheld computers, ComputerWorld, vol. 26, n 42, p. 68; Oct. 1992.

Electronic price labels add accuracy, may boom in '90s, Drug Store News, vol. 0, n. 0, p. 8; Oct. 1990.

I–S in transition: how grocers bag shoppers, Computer Decision, vol. 21, n 4, p. 44–45; Apr. 1989.

* cited by examiner

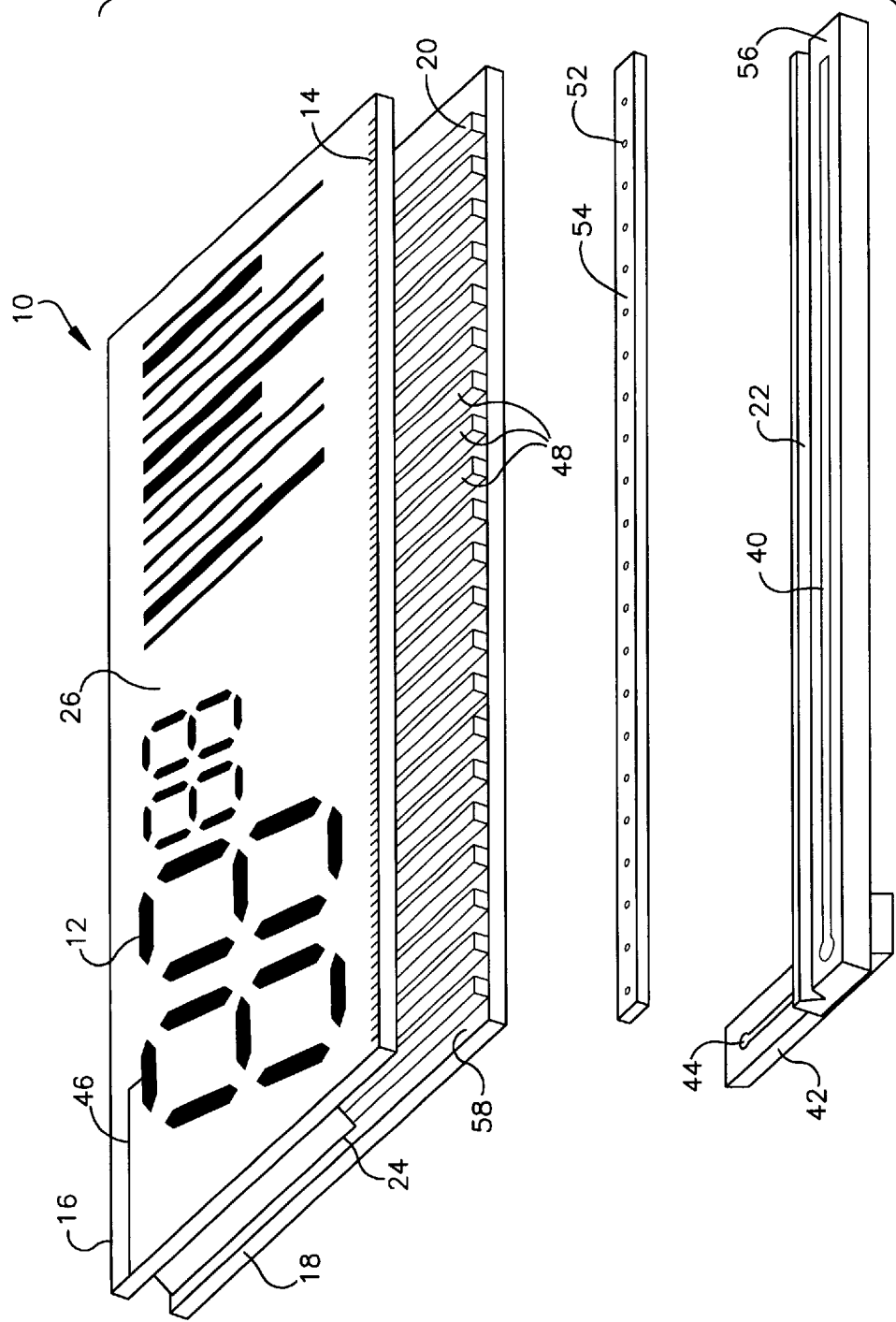

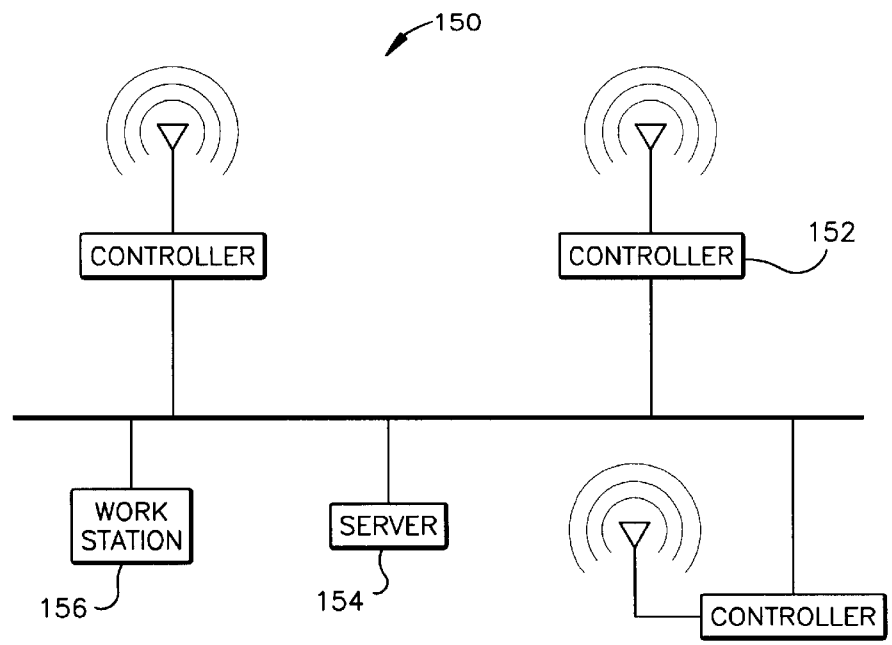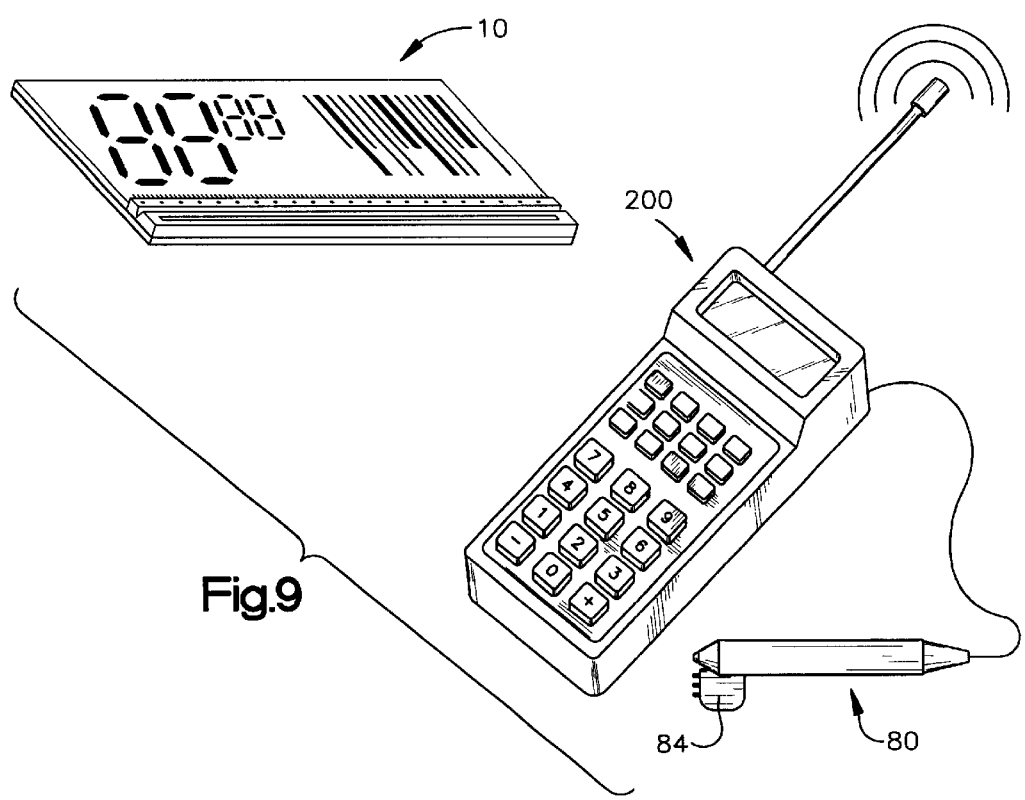
Fig.9

Fig.12A — POS PRICING DATABASE (314)

| PRODUCT ID | PRICE |
|---|---|
| 1620014609 | 0.89 |
| 1620015123 | 0.79 |
| 1620015368 | 2.29 |
| 1620016111 | 1.49 |
| 1620016589 | 1.19 |
| 1620017606 | 0.85 |
| 1620018934 | 0.69 |

Fig.12B — TEMPORARY PRICING DATABASE (316)

| PRODUCT ID | OLD PRICE | NEW PRICE | EFFECTIVE DATE | EFFECTIVE TIME |
|---|---|---|---|---|
| 1620014609 | 0.89 | 0.93 | 031598 | 17:00 |
| 1620015123 | 0.79 | 0.86 | 031798 | 15:00 |
| 1620015368 | 2.29 | 2.59 | 031998 | 08:00 |
| 1620016111 | 1.49 | 1.69 | 032098 | 08:00 |
| 1620016589 | 1.19 | 1.29 | 032298 | 08:00 |
| 1620017606 | 0.85 | 0.99 | 032298 | 17:00 |
| 1620018934 | 0.69 | 0.72 | 032798 | 17:00 |

Fig.12C — SHELF TAG DATABASE (318)

| TAG ID | PRODUCT ID |
|---|---|
| 001256 | 1620014609 |
| 001258 | 1620015123 |
| 001262 | 1620015368 |
| 001268 | 1620016111 |
| 001272 | 1620016589 |
| 001274 | 1620017606 |
| 001286 | 1620018934 |

Fig.12D — PERIODIC PRICE CHANGES DATABASE (317)

| PRODUCT ID | REGULAR PRICE | ALTERNATE PRICE PERIOD | ALTERNATE PRICE |
|---|---|---|---|
| 1620014609 | 0.89 | 17:00 06:00 | 0.79 |
| 1620015123 | 0.79 | 15:00 06:00 | 0.69 |
| 1620015368 | 2.29 | 12:00 08:00 | 1.99 |
| 1620016111 | 1.49 | 12:00 06:00 | 1.29 |
| 1620016589 | 1.19 | 12:00 09:00 | 0.99 |
| 1620017606 | 0.85 | 12:00 06:00 | 0.79 |
| 1620018934 | 0.69 | 11:00 08:00 | 0.39 |

PROGRAMMABLE SHELF TAG SYSTEM

RELATED APPLICATIONS

The present application is a continuation-in-part (CIP) of U.S. application Ser. No. 08/430,350, now U.S. Pat. No. 5,751,257, filed Apr. 28, 1995.

TECHNICAL FIELD

The present invention relates generally to an electronic pricing and display system using programmable electronic shelf tags. More specifically, the present invention relates to a programmable shelf tag along with an apparatus and method for programming the shelf tag and incorporating pricing and product information into a computer system for such purposes as inventory control, and updating pricing and product information throughout a facility in a fast and convenient manner.

BACKGROUND OF THE INVENTION

Shelf tags have been used for many years to display pricing information in association with the shelving on which various products are displayed for purchase. Along with pricing information, shelf tags may include additional information including bar codes representing a product on the shelf which can be used for inventory control, as well as product information or additional material. Such shelf tags have conventionally been simply constructed of a paper material on which pricing and product information is printed, which can then be placed directly on the shelving adjacent the product to which it pertains. Shelving associated with the display of product in supermarkets and other retail stores have been designed to accommodate shelf tags, with these types of shelf tags placed within a flexible plastic casing which can be snap fit onto a shelf at an appropriate position. The plastic case allows the shelf tag to be easily removed and replaced to update pricing or other information when needed.

Although serving the desired purpose, these types of shelf tags are somewhat cumbersome in use, in that updating of the pricing information requires physical removal and replacement of the shelf tag, which for retail environments becomes time consuming and expensive. Further, updating of pricing or other information on the shelf tag requires complete replacement, necessitating continuous repurchasing of new shelf tags with properly printed updated information thereon. These characteristics of the shelf tag also result in a risk that pricing or other information is not updated accurately or the shelf tags are not replaced properly.

The above problems with common shelf tags have led to the development of electronic shelf tags. Current electronic shelf tags implement the simple function of displaying information, such as a goods price, in a complicated and expensive manner. Known electronic shelf tags require an electronic display such as a liquid crystal display (LCD), display driver circuitry, programing interface circuitry, an independent power source, and other miscellaneous control circuitry to accomplish this simple function. One major drawback to the prior art devices is that the shelf tag must continuously be supplied with power to maintain its display. The power necessary to maintain the display has thus limited the amount of information which can be reasonable displayed and requires frequent replacement of a battery power supply. Also the addressing schemes used to write information onto typical LCD displays requires many connections making it necessary to incorporate the interface and driver circuitry directly into the shelf tag. Additionally, due to the sensitive nature of electronics to environmental conditions and LCD displays typically being made with glass, the known shelf tags are fragile and can be easily damaged by unconcerned shoppers or others unaware of the devices frail structure.

Also, to program and change the information displayed in known electronic shelf tags, a fixed connection between the shelf tag and the programming device must be maintained which is inconvenient and time consuming for persons assigned to change the information. Additionally, the shelf tags would require additional memory circuitry in order for a programming device to monitor the current value being displayed before writing new information over it. This function would be critical to an inventory control system.

Further to the above deficiencies of known electronic shelf tags, a main problem is associated with their cost with all of the necessary additional circuitry and constant power requirements, current electronic shelf tags are prohibitively expensive, particularly for large stores that would require hundreds of tags from using the electronic shelf tags in place of standard paper shelf tags.

SUMMARY OF THE INVENTION

Based upon the foregoing deficiencies in the prior art, it is an object of the present invention to provide an inexpensive, nonvolatile electronic shelf tag that requires no additional circuitry and no power source to maintain its display of information. The invention provides an electronic shelf tag that is easily programmable and can display a variety of information while maintaining whatever information is programmed onto it indefinitely with no continued power requirements or electronics.

A further object of the invention is to provide a programmable electronic shelf tag which utilizes flexible plastic substrate in its fabrication to increase the durability and adaptability of the shelf tag for use in retail environments. As shelf tags are placed in environments such as supermarkets and shopping malls where they may be subjected to impacts, spills, dropped products or other things which could damage them, the use of flexible plastic material will provide durability in these environments. The shelf tag of the invention will thus reduce replacement costs for damaged shelf tags, adding to their cost effectiveness. The construction of the shelf tag also does not require any packaging, as the shelf tag is adaptable to snap into existing retaining devices associated with conventional merchandise shelving.

Another object of the present invention is to provide an apparatus for interfacing with the shelf tag in order to program new information into the display, with the apparatus supplying power and necessary control signals to reprogram the shelf tag. In a preferred embodiment, a hand-held apparatus is provided that can be easily used to program the shelf tag by simply entering desired information to be displayed via an input device such as a keypad, and interfacing the apparatus with the shelf tag to update display information. The ease of entering data and the versatility of the shelf tags decreases labor costs and allows information to be verified so any mistaken information erroneously entered onto the shelf tags can be changed immediately.

A further object of the present invention is to provide an apparatus and method for programming a shelf tag and a method of taking inventory and updating a shelf tag in an integrated manner via a computer network, such as a micro cellular local area network (LAN). Such LAN's may use wireless communication from portable devices such as bar code readers to maintain and update a variety of product information. The present invention provides an apparatus for programming the shelf tag integrated with a data collection device for use in a micro cellular local area network, to allow information on prices, inventory and other types of data to be instantly tracked, updated and changed, both in the LAN and on the shelf tag. The method of the present invention simplifies and integrates a larger number of tasks that are common in many businesses, further lowering operating costs by reducing labor.

This along with other objects and advantages of the present invention will become more readily apparent from a reading of the detailed description taken in conjunction with the drawings and the claims.

BRIEF DESCRIPTION OF THE DRAWINGS

FIG. 3 is an exploded perspective view of the shelf tag shown in FIG. 1.

FIG. 9 is a system diagram of the components necessary to implement a method of taking inventory and updating price and other information via a radio frequency computer local area network. The system diagram includes a representation of a radio frequency computer local area network, a shelf tag and a portable tele-transaction computer equipped with an optical bar code reader wand and a shelf tag programming interface.

FIG. 12A illustrates a point-of-sale (POS) pricing database.

FIG. 12B illustrates a temporary pricing database.

FIG. 12C illustrates a shelf tag database.

FIG. 12D illustrates a periodic price changes database.

DETAILED DESCRIPTION OF THE PREFERRED EMBODIMENT

Figure 1:
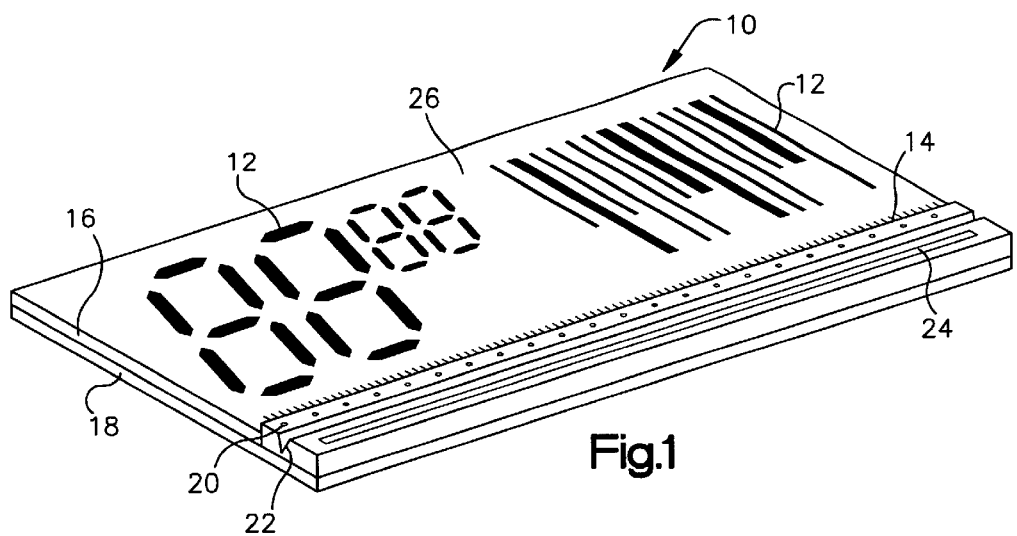
FIG. 1 is a perspective view of the shelf tag according to the preferred embodiment showing price display digits and bar code display digits.

Referring now to the drawings, a preferred embodiment of a shelf tag 10 according to the invention is shown in FIG. 1. The shelf tag 10 includes a liquid crystal display (LCD) comprised of a layer of liquid crystals, schematically shown at 26 sandwiched between a transparent surface 16 and a light absorbing (i.e., black) surface 18. The liquid crystal layer 26 is formed of liquid crystal material having first and second optical states which are both stable in the absence of an electric field. Formed in the liquid crystals display are individual character elements 12 used to generate numerals, alpha-numeric characters for lettering, bar codes and/or other characters or forms to be displayed. To program the character elements 12 between the first and second optical states, an interface to the character elements 12 includes a common contact 24 and a set of signal contacts 20. A programmer alignment track 22 may be used to guide a programming device linearly across the common contact 24 and the signal contacts 20. Printed or otherwise formed along the front of the transparent surface 16 are synchronizing indicators 14 which provide feedback to a programming device as to which character element 12 is to be programmed.

It should be recognized from the foregoing, that the shelf tag 10 provides a very simple structure which can be fabricated using flexible plastic substrates such as Mylar film or other suitable flexible plastic materials. These materials are easily produced in the desired configuration and are extremely cost effective, to make a shelf tag 10 viable for large scale use in retail environments. Forming the shelf tag 10 of flexible plastic substrates also makes the shelf tag 10 compatible with common display shelving, wherein the shelf tag 10 can be bent slightly so as to snap into existing retaining devices already attached to such shelving. In this way, the shelf tag 10 will not require any external packaging, again enhancing its cost effective manufacture and use.

Figure 2A:
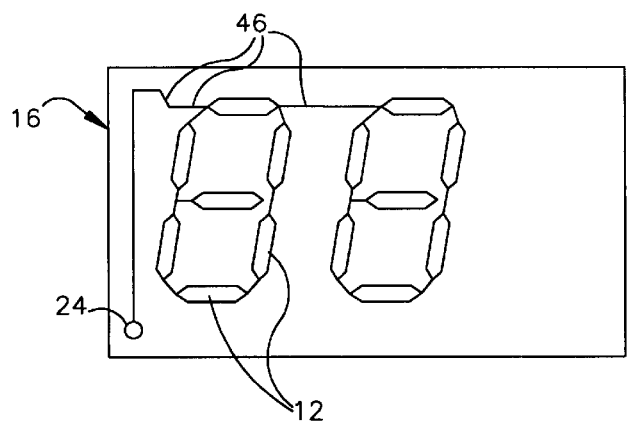
FIGS. 2A and 2B show plan views of front and back plates of the shelf tag shown in FIG. 1.
Figure 2B:
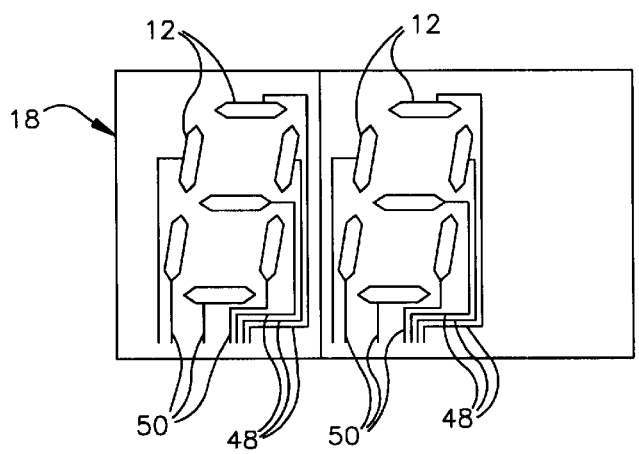

Turning to FIGS. 2A and 2B, the surfaces 16 and 18 forming a part of the shelf tag 10 shown in FIG. 1 are shown in a preferred embodiment hereof. In FIG. 2A, the front or top surface 16 of the shelf tag 10 is again preferably a transparent sheet of a plastic material having front and back surfaces, with the back surface having character elements as well as conductors preferably formed thereon. As an example, the Mylar film or other suitable sheet of plastic material may be coated with a layer of indium tin oxide, which can then be etched to provide to provide the individual desired character or display elements 12 as well as to provide various conductor elements 46 and common conductor 24. In this particular embodiment, the character elements 12 are all connected to one another via a common conductor coupled to contact 24 and comprising the individual conductor elements 46. As shown in FIG. 2A, the character elements 12 may be positioned to form a common digital 8 configuration including 7 individual character elements, so as to enable display of pricing information. Alternatively, character elements 12 may be otherwise configured to display other desired information, such as alpha-numeric characters utilizing 11 similar character elements 12 in a known manner. Because the character elements 12 are easily formed by etching or similar process, any other display configurations for character elements 12 may be used in association with shelf tag 10. Referring back to FIG. 1, other display elements 12 can thus be used to make up a bar code configuration which can be formed in a similar manner.

In conjunction with a top surface 16 as shown in FIG. 2A, the bottom surface 18 is configured in a corresponding fashion, to match character elements 12 formed on the top sheet 16. As previously indicated with respect to FIG. 1, between top sheet 16 and bottom sheet 18, a layer of liquid crystal material 26 is formed, with character elements 12 formed on the bottom of sheet 16 and top of sheet 18 in matching relationship such that liquid crystal material 26 is disposed between each pair of character elements 12. The character elements 12 formed on bottom sheet 18 may also be etched from a coating of conductive material such as indium tin oxide to provide the individual desired elements 12, along with conductors 48 formed for each of the character elements 12 on bottom sheet 18. The conductors 48 are fed to a bottom side of sheet 18, and in turn form a set of individual contacts 50 used to interface with each of the individual character elements 12 formed on the top surface of sheet 18. In both FIGS. 2A and 2B, the character elements 12 as well as conductors 46 and 48 provide transparent electrodes applied to respective adjacent sides of plates 16 and 18, with corresponding electrodes forming character elements 12 on plates 16 and 18 used to impress an electric field across the liquid crystal material 26 disposed there between. The electric field is used to switch the optical states of the liquid crystal material 26.

The shelf tag 10 is constructed around the use of liquid crystal material 26 which have two optical states, both stable in the absence of any electric field. By injecting a polymeric stabilizer into the liquid crystals 26, two unenergized stable optical states are produced. The two optic states consist of a scattering or focal conic state, where light passes through the liquid crystal 26 to appear transparent, and a reflecting or planar state where light does not pass through the liquid crystal 26. The liquid crystal material 26 is therefore sandwiched between the transparent character elements 12 on which 16 coupled to common conductor 46 and character elements 12 on the back plate 18 coupled to individual conductors 48 for each character element 12. The back plate 18 could be formed as transparent reflective or opaque (i.e., black) or have its back surface provided with an opaque layer or coating. In operation when the optical condition of the liquid crystal 26 character elements 12 allows light to pass, the viewer sees the black surface formed on sheet 18, making the character element 12 appear dark. When the optical condition of the liquid crystal 26 does not allow light to pass, light entering from the transparent front plate 16 is reflected making the character element 12 appear light and virtually unreadable.

In a preferred embodiment of the shelf tag 10, the LCD display uses stabilized cholesteric liquid materials which exhibit bistable behavior. This liquid crystal material and application in an LCD is described in more detail in *Cholesteric Liquid Crystal/Polymer GEL DISPERSION: Reflective Display Application* (May 1992) SID Digest of Technical Papers, pp. 759–782, *Cholesteric Reflective Display: Drive Scheme & Contrast* (1992), Journal of Applied Physics, Vol. 64, No. 15, page 1905, and *Control of Reflectivity & Bistabilily in Displays using Cholesteric Liquid Crystals* (1994), Journal of Applied Physics, Vol. 76, No. 2, page 11331, each of which are expressly incorporated herein by reference in their entireties. In construction, the flexible substrate, being either front plate 16 or back plate 18 may be laminated with a layer of polymer stabilized cholesteric liquid crystal material 26. Subsequently, when plates 16 and 18 are then positioned adjacent one another to sandwich the liquid crystal material 26 there between. Control signals may then be applied to the common contact 24 and individual ones of the signal contacts 20 to change the optical state of the bistable liquid crystal material 26 between either reflecting or scattering optical states to generate a desired display on the LCD. Control signals may be symmetrical wave forms providing an instantaneous voltage magnitude across a particular character element defined by the etched transparent conductors forming the character elements on the top and back plates 16 and 18 respectively, so as to change the optical state of the liquid crystal material 26 for that character element 12. The individual signal contacts 20 and associated conductors 46 in conjunction with the common contact 24 and corresponding conductor 48 allow any of the individual character elements 12 to be changed from the reflecting or scattering optical states accordingly.

In order to easily interface a programming device to the shelf tag 10, the set of signal contacts 20, and common contact 24 are used. In a preferred embodiment as shown in FIG. 3, the common contact 24 may be interfaced by means of a nonconductive strip 56, preferably plastic, which can easily be configured with an alignment track 22 molded or cut in the shape of a groove running the length of the strip 56. Below the alignment track 22 is an electrical conductor 40 embedded into the strip 56 and exposed on the top of strip 56 to provide an interface for coupling reference signals to the common contact 24. At one end of the strip 56, the electrical conductor 40 is disposed through strip 56 to allow a connection of conductor 40 from the bottom side of strip 56. On one end of the strip 56, an extension arm 42 extends outward, with extension arm 42 having an electrical conductor 44 embedded in it which is exposed on one side of the extension arm 42. The electrical conductor 44 is coupled to the electrical conductor 40 in the strip 56, and in turn is electrically coupled to the common contact 24 upon being assembled in shelf tag 10. To interface to the individual signal contacts 2 and to conductors 48 of each character element 12, a set of individual conductors 52 may be formed in an elongated nonconductive strip 54 so that the individual conductors 52 pass through both sides of the strip 54. Conductors 52 are coupled to individual signal contacts 20 upon assembly of the strip 54 with tag 10 as will be described hereinafter.

As seen in FIG. 3, the back plate 18 is wider than the front plate 16 to expose contacts 20 beyond front plate 16. Similarly, the length of front plate 16 allows common contact 24 to be exposed beyond back plate 18 when the plates are positioned adjacent one another. When connecting the components that make up the shelf tag 10, the back plate 18 provides a base which all other components will be stacked on and attached to by methods common in the art such as adhesives. The strip 56 with the extension arm 42 attached is placed on the back plate 18 along its lower front edge 58, such that conductor 44 connects to common contact 24 in turn connecting contact 24 to strip conductor 40. Strip 54 with conductors 52 is positioned adjacent strip 56 with each of conductors 52 connecting to an individual contact 20. The transparent front plate 16 is placed on top of the back plate 18. Each individual conductor 52 is aligned with and electrically coupled to each corresponding contact 20 completing the interface path from the individual conductors 52 to the individual contacts 20 and to each conductor of each character element 12. In this manner, each of the individual contacts 20 is electrically accessible by means of conductors 52 at a position exterior to the shelf tag 10 while providing a compact shelf tag construction. Similarly, the common contact 24 is electrically coupled to the strip conductor 40 which is easily accessible adjacent each of the individual conductors 52, such that each of the common and individual contacts 24 and 20 respectively can be fed data signals generated by a programming device at an easily accessible position on the shelf tag 10.

Figure 4:
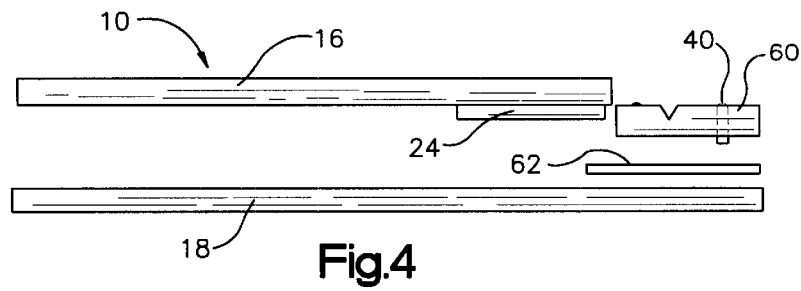
FIG. 4 is a side elevational exploded view of an alternative embodiment of the shelf tag shown in FIG. 1.

In an alternative embodiment of the shelf tag 10, as shown in FIG. 4, a combined contact strip and guide 60 is used to replace the combination of a nonconductive strip 56 and extension arm 42 as shown in FIG. 3. A conductive adhesive 62, such as a z-axis conductive adhesive, may be placed on the back plate 18 along its lower front edge or at a similar relative location, such that upon joining of the front plate 16 and back plate 18, the conductive adhesive 62 electrically couples common contacts 24 with strip conductor 40. the arrangement of individual conductors 52 may be configured in a manner similar to that shown in FIG. 3 to be electrically coupled to contacts 20. This combination allows for simpler production of the shelf tag and fewer components which both add cost savings to the shelf tag. Other suitable arrangements for electrically coupling the common and individual contacts of the shelf tag to be accessible exterior to the shelf tag 10 are also contemplated in the invention.

The set of synchronizing indicators 14 are printed or otherwise formed into the front plate 16 along its lower edge running lengthwise. In the preferred embodiment, these synchronizing indicators 14 will be read optically to provide a programming device with feedback as to which character element 12 it is coupled with, to correctly program the individual character elements 12 for display of desired information via the LCD. In the preferred embodiment, the synchronizing indicators 14 may assume a similar configuration to that of a bar code using a plurality of dark and light areas. A typical bar code reader and decoder arrangement is described in U.S. Pat. No. 4,104,514, which is hereby incorporated by reference herein as a suitable arrangement for configuring the synchronizing indicators 14 in a bar code format to be read and decoded in a similar manner. Conventionally, the dark areas are referred to as bars, while the light areas are referred to as spaces. Information typically is carried in the width of the bars as well as the width of the spaces along with their relationship to one another. Generally, an optical signal is generated by admitting light onto the series of bars and spaces, and receiving via an optical detector reflected light from the surface. An analog wave form representing the bar/pattern is generated by the optical detector and is digitized, wherein a bar may be represented by a "One" value and a space represented by a "Zero". The synchronizing indicators 14 may then be similarly read by relative movement of the indicators 14 relative to the optical reader. The sequence of bars and spaces, referred to as elements, are then read with the width of each element being a multiple of a standard dimension called a module. In most bar codes, elements are from 1–3 modules wide, with the character set representable by the bar code and the number of elements per character are varying from one symbology to another. Any bar code configuration may therefore be useable in the present invention, with conventional bar code readers also usable in conjunction with the invention. The synchronizing indicators 14 may include a preamble section which will indicate the beginning and set the format for scanning and reading the synchronizing indicators 14. The preferred embodiment uses optics to synchronize the programming device but other devices such as mechanical or electrical contacts could be used to provide pulse or count information indicative of the position of contacts associated with each character element 12.

Figure 5:
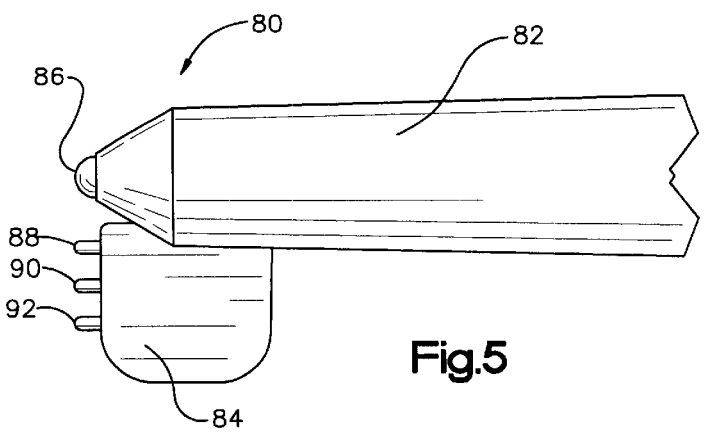
FIG. 5 is magnified side elevational view of an optical bar code reader wand with a shelf tag programming interface.
Figure 6A:
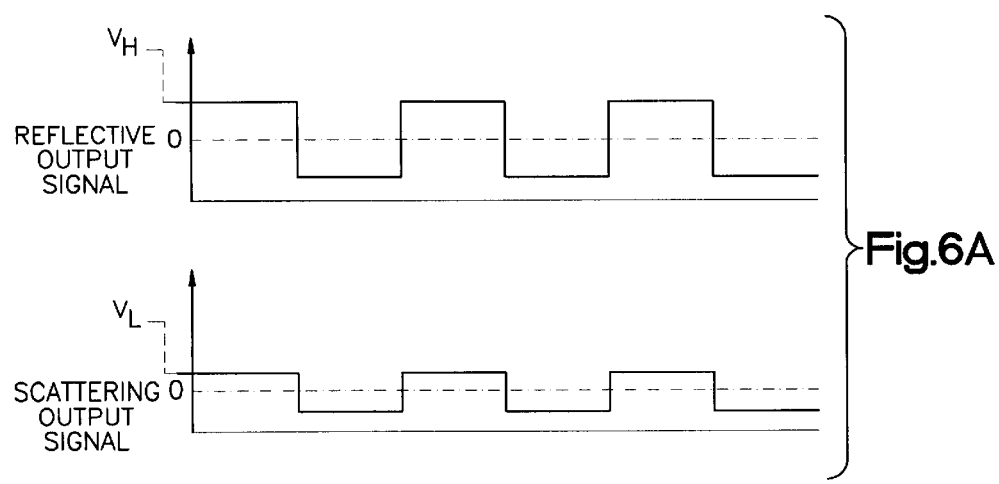
FIG. 6A represents schematically a plurality of exemplary voltage wave forms used to switch the optical state of each character element of the bistable liquid crystal display shown in FIG. 1.
Figure 6B:
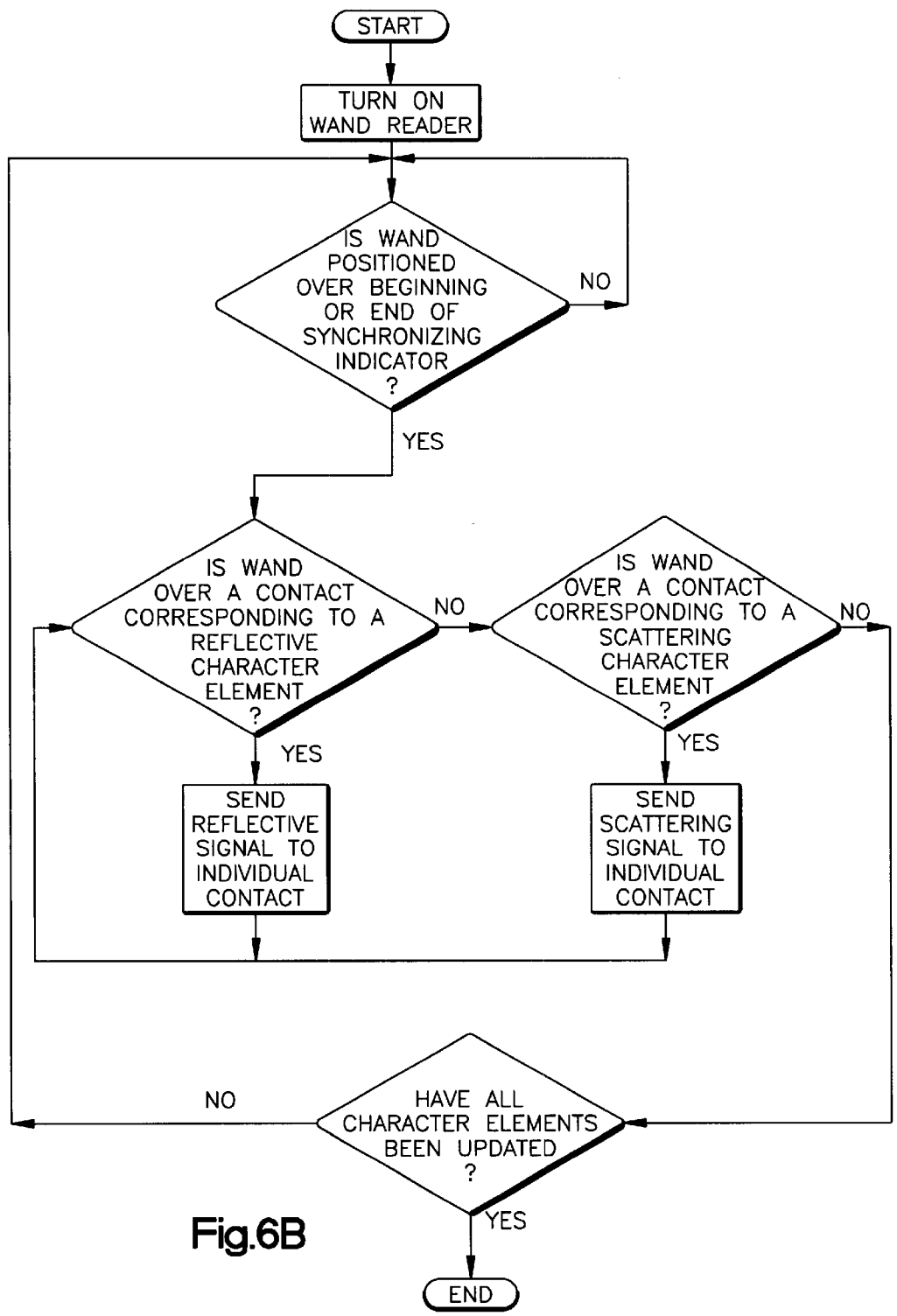
FIG. 6B is a flow chart indicating a typical sequence for programming a shelf tag.

A first preferred embodiment of a programming device 200 used to change the shelf tag's 10 display is shown in FIG. 9. The programming device 200 is a portable tele-transaction computer capable of sending and receiving information via radio frequency carrier signals, accepting user input via a keypad and reading bar code information and outputting shelf tag 10 programming data. Referring to FIG. 5, to perform the programming of the shelf tag 10, an optical bar code reader wand 80 with a programming interface 84 for use with shelf tag 10 may be used. The preferred embodiment of the wand 80 has a pen-shaped elongated body 82 typically fabricated from plastic or metal with an optical sensor 86 provided in the tip of the body 82. Below the optical sensor 86 the programming interface 84 is mounted to the body 82. Extending from and securely mounted to the programming interface 84 is the individual output pin 88, the alignment pin 90 and the common output pin 92. Also in the preferred embodiment, the use of alignment track 22 on tag 10 allows proper positioning of output pins 88 and 92 in conjunction with an alignment pin 90. The alignment pin 90 is only used for mechanical alignment of the interface 84 with tag 10. The alignment pin 90 is placed by the user in the programmer alignment track 22 of the shelf tag 10. By keeping the alignment pin 90 in the track 22 the user can sweep across the common contact 24 and the set of signal contacts 20 in an even and linear manner. It should be noted that the alignment pin 90 and track 22 are for the users benefit but neither is necessary to the programming of the shelf tag 10. All that is needed is a proper connection of the output pins 88 and 92 and the signal contacts 20 and the common contact 24 respectively. FIG. 6A shows an example of the relationship between the signals emitted through the common output pin 92 and the individual output pins 88 used to change the optical state of character elements 12. The common output pin 92 provides a ground reference to the common contact 24. To maintain a reflective optical state on the character element 12, the individual output pin 88 also emits a wave form symmetrical about zero with a peak to peak magnitude of $V_H$ as shown in FIG. 6A. To change the character element 12 from the reflective optical state to a scattering state, the same common signal should be output from the common output pin 92 and the individual output pin 88 should follow the wave form shown in FIG. 6A for a scattering optical state which is a symmetrical wave form of $V_L$ wherein $V_L$ is the voltage necessary to change to scattering. It should be noted that both the reflective and scattering wave forms differ in magnitude. The optical sensor 86, the individual output pin 88 and the common output pin 92 are all electrically coupled to the programming device 200 by wires running through the body 82 of the wand 80 and back to the programming device 200. A typical sequence of steps for programming a shelf tag 10 are shown in the flow chart of FIG. 6B. The sequence may begin by turning the optical sensor 86 of the wand 80 on. The programming device 200 will then determine whether the wand is positioned over the beginning or the end of the synchronizing indicators 14. If not, the program will loop back and continue to check whether the wand 80 is positioned over the beginning or end of the synchronizing indicators 14. Once the wand 80 is positioned correctly the programming device 200 will determine if the wand 80 is over a signal contact 20 corresponding to a character element 12 that is to be programmed to a reflective optical state. If it is, the programming device 200 will send a reflective signal to pin 88 to cause the character element 12 to take on a reflective state. Alternatively, if the wand is over a contact for a character element to be updated to a scattering state, this is determined in a next processing step, and a corresponding scattering signal is sent to the individual output pin 88. The programming device will loop back and repeat the above sequence until it is determined if all character elements 12 have been updated If so, the program will end and if not, the program will loop back and determine if the wand 80 is positioned over the beginning or end of the synchronizing indicators 14.

Figure 7:
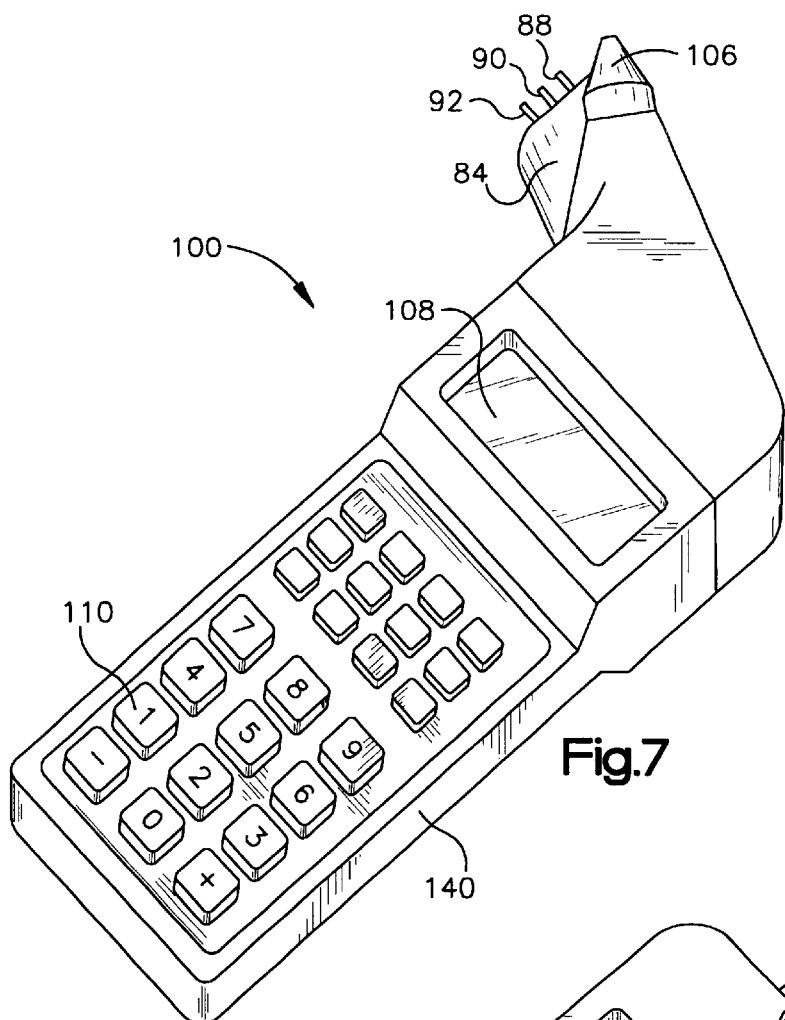
FIG. 7 is a perspective view of a stand-alone shelf tag programming device.
Figure 8:
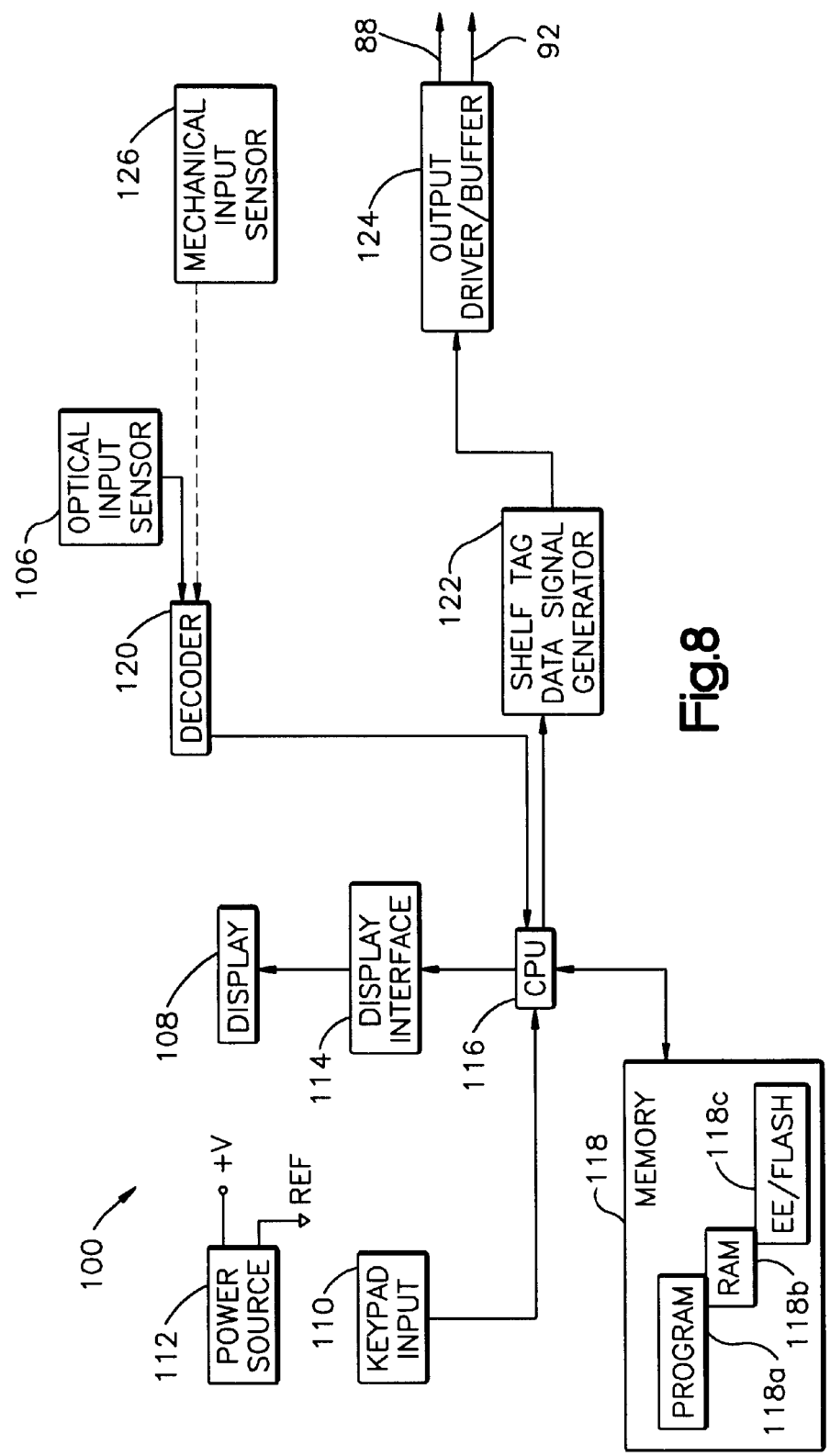
FIG. 8 is a block diagram of the circuitry the stand-alone shelf tag programming device shown in FIG. 7 comprises.

Although the preferred embodiment of the programming device 200 is the portable tele-transaction computer, such as that depicted in FIG. 9, an alternate embodiment is shown in FIGS. 7 and 8. A hand-held stand-alone programmer 100 is shown in FIG. 7 which incorporates a small, easily handled housing 140 preferably manufactured from durable hardened plastic or rubber. The programmer may include a keypad 110 for user input to be programmed into the shelf tags 10, or another input mechanism may be provided. Optionally the programmer 100 may include an electronic display 108 to prompt and view user input A fixed optical sensor 106 for synchronizing programmer 100 with tag 10 may again be provided, or suitable alternative arrangements. The programming interface 84 as shown in FIG. 5 again may comprise an alignment pin 90, an individual output pin 88 and a common output pin 92. FIG. 8 depicts the standalone programmer 100 in functional block diagram format A central processing unit or CPU 116 performs all of the data input and output control end manipulation. The CPU 116 reads the program memory 118$a$ for operation. The CPU 116 uses the random access memory or RAM 118$b$ for manipulating data and as an option it may use nonvolatile memory 118$c$ (EEPROM, FLASH, NOVRAM) to maintain user setpoints or database information which needs to be retained when power is not applied. The CPU 116 receives user input from the keypad 110 or other input device,. and displays information for the user by sending data to the display interface 114 which then controls how the display 108 outputs the data. The optical sensor 106 transforms light into data which is then sent to a decoder 120 which prepares the data into the proper digital format for use by the CPU 116. An alternate option for use with a mechanical synchronization mechanism is a mechanical input sensor 126 which would translate mechanical movement into data for use by the CPU 116. Data to be programmed into the shelf tag 10 is sent from the CPU 116 to the shelf tag data signal generator 122 which converts the digital information into the proper format needed for changing the character elements 12 on the shelf tag 10. The formatted data is then transmitted to an output driver/buffer 124 in order to output data through the individual output pin 88 and the common output pin 92. Power is supplied to all circuitry by power source 112 which will typically be a battery, preferably rechargeable. Power could be supplied by other sources such as AC/DC adapters, solar power cells or other sources of electrical power. It should be understood that the above description of the circuitry is only illustrative, many functions can be accomplished in different electronic means, for example many display devices have display interface circuitry incorporated into them and many CPUs have different types of memory integrated into a single chip. The functions represented can therefore be electronically implemented in many different ways by someone of ordinary skill in the art.

In the course of normal operation, the stand-alone programmer 100 and the programming device 200 will be coupled by the user to the shelf tag 10 by placing the programming interface 84 adjacent shelf tag 10, and particularly with alignment pin 90 in the programmer alignment track 22 of the shelf tag 10. The programming interface 84 is swept across tag 10, either in the form of the wand 80 or the stand- alone programmer 100, from one side of the shelf tag 10 to the other in a linear fashion. The individual output pin 88 will be electrically coupled to each individual conductor 52 of the set of signal contacts 20 in turn during this sweeping action, and the common output pin 92 will be electrically coupled to the electrical conductor 40 of the common contact 24 at all times. As the programming interface 84 is moved from across the shelf tag 10 either the optical sensor 86, the optical input sensor 106 or the mechanical input sensor 126, will read the synchronizing indicators 14 on the front of the shelf tag 10 and supply the stand-alone programmer 100 or the programming device 200 with data relating to which character element 12 the programming interface 84 is currently coupled to for proper programming. Next the proper data signals are output to the shelf tag 10 and the desired character elements 12 are changed. As previously indicated, the synchronizing indicators 14 may include information stored in a preamble section of the synchronizing pattern to be used to differentiate among different shelf tag formats which are possible. The invention is therefore not limited to any particular configuration or format, with the shelf tags 10 themselves potentially of a variety of configurations to display any variety of information with the display on the tag not fixed to any single format. The information stored in the preamble section of the synchronizing pattern 14 may therefore be used to differentiate among various shelf tag formats, with the programming interface 84 adapting to any such configuration.

Referring to FIG. 9, at a possible application of the invention a plurality of shelf tags 10 will be placed on shelves near products and the shelf tag 10 will display the products price and a corresponding UPC bar code. The shelf tags 10 will be used in conjunction with a programming device 200 such as a portable tele-transaction computer (PTC) equipped with an optical bar code reader wand 80 having a shelf tag 10 programming interface 84. The PTC will be equipped with radio frequency communication capabilities that will allow it to communicate throughout the application site (i.e., a store or supermarket) with a radio frequency computer local area network (LAN) 150. The LAN 150 would be connected to at least one computer server 154, at least one computer work station 156 and at least one computer controller 152. As a store clerk is using the PTC to take inventory through the use of scanning bar codes on products or by scanning bar codes on the shelf tags 10, the PTC would communicate packets of data to the controller 152 via radio frequency. The controller 152 would then transfer the inventory data to the server 154 and/or work station 156 where the data would be processed. If the computer determines that a price needs to be changed for a particular product, the work station 156 or server 154 would direct the controller 152 to send packets of information to the PTC or programming device 200 via radio frequency. The information sent to the programming device 200 would contain a message that a particular products price needed to be changed and update information relating thereto. Once the programming device 200 receives the packets of information it would signal the user, either visually with an indicator light or message prompt, or through an audio tone or both. The user would then know to use the programming interface 84 to change the information displayed by the shelf tag 10. This type of system application would save a great deal of time and paper work while providing for greater accuracy by taking the task of properly updating shelf tag information out of the hands of store clerks who are human and are prone to make mistakes.

Figure 10:
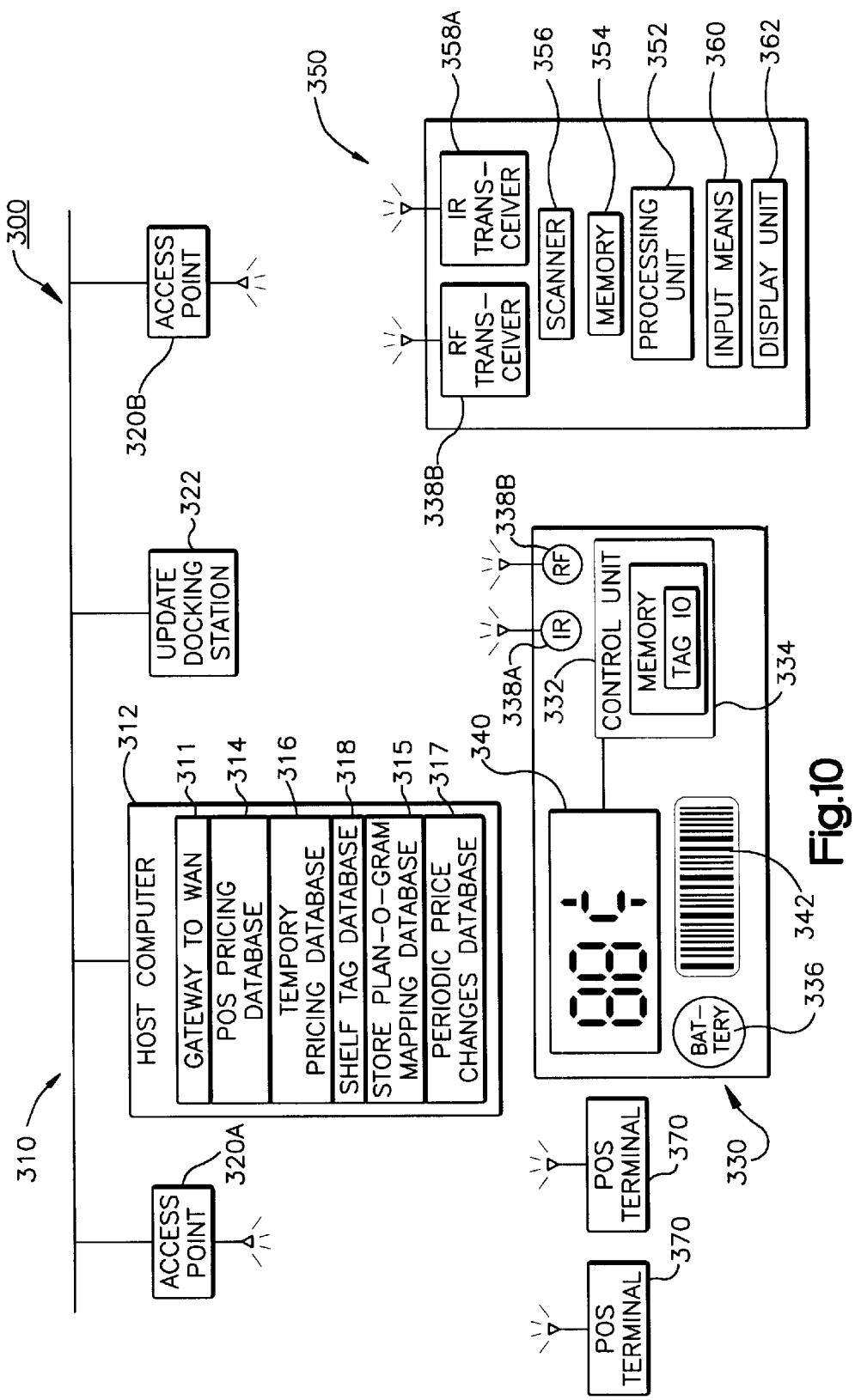
FIG. 10 is a system diagram of yet another embodiment of the present invention using wireless communications for taking inventory and updating price and other information.
Figure 13:
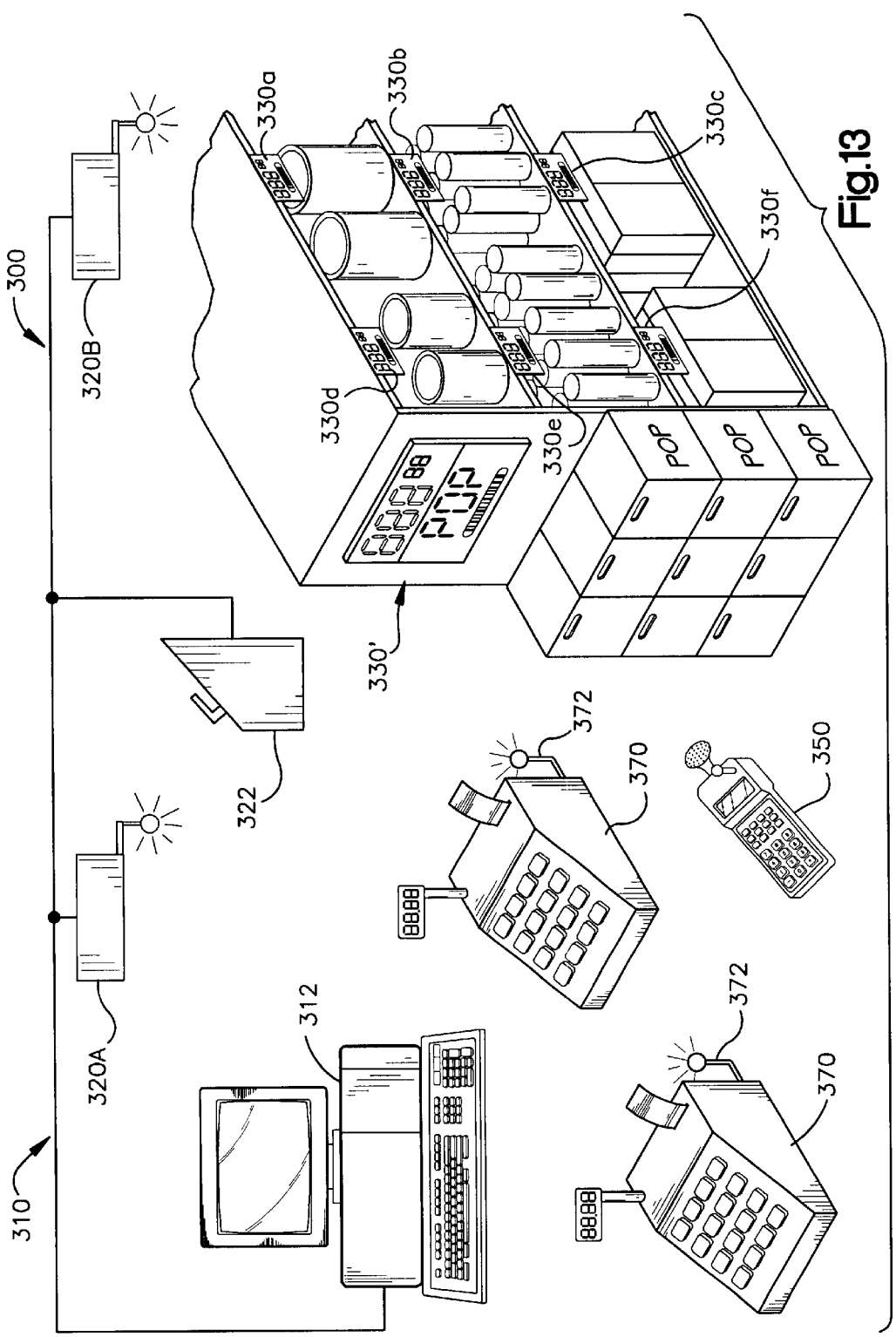
FIG. 13 illustrates a store configured with the programmable shelf tag system of the present invention.

Turning now to FIGS. 10 and 13, there is shown a programmable shelf tag system 300, which uses at least one wireless communications medium (e.g, infrared and/or RF). FIG. 10 provides a detailed block diagram of system 300, while FIG. 13 illustrates an exemplary physical representation of system 300, as configured for use in connection with a retail store. System 300 is generally comprised of a computer network 310 (e.g., a LAN or WAN), one or more electronic shelf tags 330, one or more portable or hand held programming devices 350, and one or more POS terminals 370. It will be appreciated that computer network 310 is similar to LAN 150 described above in connection with FIG. 9. Both LAN 150 and computer network 310 provide for wireless communications and price data storage, however, computer network 310 provides additional communication features and price information databases, as will be described below. It should be further noted that portable programming devices 350 are similar to programming devices 100 and 200, which are respectively described above in connection with FIGS. 7 and 9. In addition, electronic shelf tags 330 serve a similar function as shelf tag 10, which is described in detail above.

According to a preferred embodiment of the present invention, computer network 310 includes a host computer 312, a plurality of access points 320A, 320B and an update docking station 322. Host computer 312 provides overall control of computer network 310, and in a preferred embodiment takes the form of a computer workstation, such as workstation 156 described above in connection with FIG. 9. Host computer 312 includes a network gateway 311 and storage means for storing databases. The databases may include a POS pricing database 314, a temporary pricing database 316, a shelf tag database 318, a store plan-o-gram mapping database 315 and a periodic price changes database 317. These databases are described in detail below.

POS pricing database 314 includes data fields for storing such items as: (1) product IDs, which identify a particular product, and (2) pricing data, which provides a current price for a particular product (FIG. 12A). Each product ID is associated with a sale price for the respective product. Pricing database 314 supplies the pricing data to host computer 312 for use in establishing customer bills during a "check out" procedure carried out with POS terminals 370.

Temporary pricing database 316 includes data fields for storing such items as: (1) product IDs, which identify a particular product, (2) new price, which provides updated pricing data for a particular product, (3) old price, which provides the current price, (4) effective date, which provides the date the new price is effective, and (5) effective time, which provides the time the new price goes into effective (FIG. 12B). Each product ID is associated with an updated sale price for the respective product. It should be understood that the "new price" stored in temporary pricing database 316 is "updated" pricing data reflecting new prices for the products. This "updated" pricing data is not stored in POS pricing database 314 until a confirmation has been received from electronic shelf tag 330 that the price displayed thereby has been updated. This is explained in further detail below.

Shelf tag database 318 includes data fields for storing such items as: (1) product IDs, which identify a particular product, and (2) tag IDs, which identify one or more shelf tags 330 associated with the respective product (FIG. 12C). The tag IDs preferably take the form of unique "serial numbers." Accordingly, shelf tag database 318 includes a complete list of products and tag identifiers for identifying all of the shelf tags associated with each product.

Periodic price changes database 317 includes data fields for storing such items as: (1) product IDs, which identify a particular product, (2) regular price, which provides the current regular price, (3) alternate price period, which provides the time or times during which an alternate price (e.g., a discount or surcharge price) is effective, and (4) alternate price, i.e., the discount or surcharge price. This database is illustrated in FIG. 12D. The use of periodic price changes database 317 is described below.

Store plan-o-gram mapping database 315 (e.g, Plan-O-Gram mapping software from TELXON Corporation) provides mapping information which is used to associate each shelf tag 330 with location data that is indicative of the location of the shelf tag within a facility (e.g., a retail store or warehouse).

Access points 320A and 320B are access points on a wireless LAN. Access points 320A and 320B includes transceiver devices for transmitting and receiving data via a wireless medium, such as RF or infrared (IR). It will be appreciated that while only two access points are shown, the present invention may include as many access points as necessary for reliable wireless communications. For instance, each isle in a store may have its own access point.

One or more POS terminals 370 communicate with host computer 312 via the access points. POS terminals includes wireless communication means 372 for communicating with host computer 312 (e.g, via RF). POS terminals 370 are used in a "check out" procedure, wherein products are scanned and a customer bill is generated. When a product's bar code (e.g., universal product code) is scanned, POS terminal 370 interrogates host computer 312 to obtain the current price of the item from POS pricing database 314.

A docking station 322 is communicatively coupled to computer network 310. Docking station 322 is configured to receive and interface with portable programming device 350 when operating in a "batch mode", and allow data transfer between portable programming device 350 and computer network 310. Operation of docking station 322 is provided in detail below.

Electronic shelf tag 330 is generally comprised of a control unit 332, a memory device 334, a power source 336, tag transceivers 338A and 338B, a display unit 340 and a code display means 342. Control unit 332 provides overall control of electronic shelf tag 330, in addition to processing data. In a preferred embodiment, control unit 332 is a microprocessor or microcontroller. Memory 334 preferably takes the form of a RAM, for storing such items as a tag ID (e.g., a serial no.), which identifies the respective shelf tag 330, and for refreshing the display. Power source 336 provides power to shelf tag 330, and is preferably a battery. Tag transceivers 338A and 338B are transceiver devices for transmitting and receiving data via a wireless medium. Tag transceiver 338A is provided for infrared (IR) communications, while tag transceiver 338B is provided for RF communications. In a preferred embodiment, IR tag transceiver 338A communicates with electronic shelf tag 330, while RF tag transceiver 338B communicates with host computer 312 via the access points. Display unit 340 displays a product price and/or other product information (e.g., a product name or advertising slogan), and preferably takes the form of a low power display, such as an LCD or LED display. For instance, display unit 340 may be comparable to the LCD display of shelf tag 10, as described above in connection with FIGS. 2A and 2B. Code display means 342 displays a code, e.g., a universal product code (UPC) associated with a particular product and/or a tag ID or serial number identifying the respective shelf tag 330. Code display means 342 preferably takes the form of a code (e.g., a bar code) printed on a label or sticker which is applied to the housing of shelf tag 330. Moreover, code display means may take the form of a code printed directly onto the housing of shelf tag 330, or a low power display unit such as an LCD or LED display.

Figure 11:
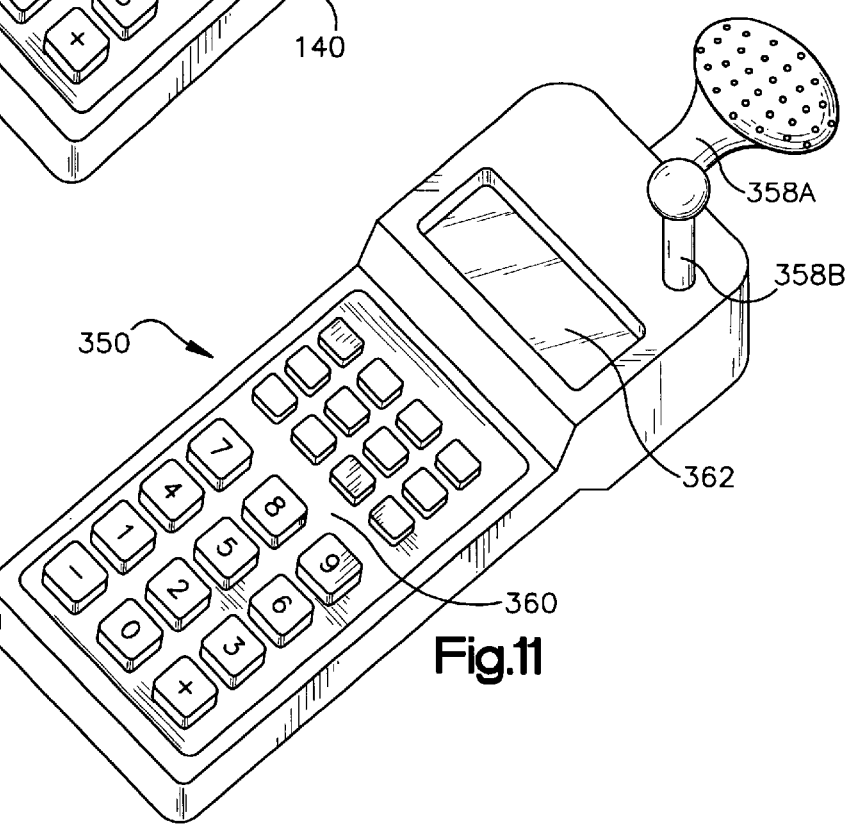
FIG. 11 is an exemplary illustration of a portable programming device.

Portable programming device 350 is generally comprised of a processing unit 352, a memory 354, a scanner 356, transceivers 358A and 358B, input means 360 and a display unit 362. An exemplary physical representation of portable programming device 350 is shown in FIG. 11. Processing unit 352 provides overall control of programming device 350, and preferably takes the form of a microprocessor or microcontroller. Memory 354 stores data, including program data. Memory 354 preferably includes both RAM and ROM. Memory 354 stores such items as: (1) pricing data and (2) respective tag IDs, as will be explained below. Scanner 356 is a scanning device for scanning code display means 342 or shelf tag 330. In a preferred embodiment, scanner 356 is a bar code scanner. Transceivers 358A, 358B are transceiver devices for transmitting and receiving data via a wireless medium. Tag transceiver 358A is provided for infrared (IR) communications, while transceiver 358B is provided for RF communications. In a preferred embodiment, IR transceiver 358A communicates with electronic shelf tag 330, while RF transceiver 358B communicates with host computer 312 via the access points. Input means 360 allows user input to programming device 350, and may include a keyboard or other suitable data entry device, such as a touch screen, voice input device, stylus, etc. For instance, input means could be used to enter pricing data, product IDs and/or tag IDs. Input means 360 may take the form of keypad 110, as described above in connection with FIGS. 7 and 8. Display unit 362 provides a display of data entered via input means 360, as well as other data received by or stored in programming device 350. Display unit 362 may take the form of a low power display such as an LCD or LED display unit. For instance, display unit 362 may be comparable to display 108, which is described above in connection with FIGS. 7 and 8.

It should be appreciated that in an alternative embodiment, any or all of the databases 314,315, 316,317 and 318 may be combined into a single database. Moreover, any or all of the data stored in these databases may be transferred to programming device 350, as needed for convenient access in a particular application.

In one embodiment of the present invention programmable shelf tag system 300 includes only computer network 310 and shelf tags 330. Pricing information is entered into temporary pricing database 316, including product ID, old price, new price, effective date and effective time. This pricing information may be directly entered by an operator via host computer 312, or it may be downloaded into temporary pricing database 316 from a remote location, e.g., via modem, the Internet, satellite, and the like. Shelf tag database 318 is accessed to determine the tag ID associated with each product ID. Thereafter, host computer 312 individually broadcasts each new price and the respective tag IDs to all of the shelf tags 330, using access points 320A, 320B. This broadcast continues until an acknowledge signal is received, as will be described below. All of the shelf tags 330 receive the broadcast initiated by host computer 312 via their respective RF transceivers 338B. Control unit 332 compares the received tag ID to a tag ID stored in memory 334. If there is a match, control unit 332 sends signals to display unit 340 to modify the display to reflect the received new price. Control unit 332 then broadcasts an acknowledge signal (via RF transceiver 338B3) to host computer 312 acknowledging completion of the update. When host computer 312 receives the acknowledge signal, the respective new price data in temporary pricing database 316 is moved to an appropriate field in POS pricing database 314. Therefore, the new price for the associated product becomes the current price, and is thus reflected in customer bills during "check out" at POS terminals 370.

In an "RF embodiment" of the present invention, programming device 350 is used in connection with computer network 310 and shelftag 330. In this regard, host computer 312 individually broadcasts (via access points 320A, 320B) each new price and the respective tag IDs to programming device 350, rather than to shelf tags 330 directly. Programming device 350 receives pricing information from host computer 312 in real time. In this regard, data is transmitted by the access points to RF transceiver 358B. Programming device 350 stores the received new prices and respective tag IDs in memory 354. Next, programming device 350 sequentially broadcasts the new prices and tag IDs to all of the shelf tags 330, using IR transceiver 358A. This broadcast continues until an acknowledge signal is received, as will be described below. All of the shelf tags 330 receive the broadcast via their respective IR transceivers 338A, as the operator of programming device 350 walks through the store isles with portable programming device 350. Control unit 332 compares the received tag ID to a tag ID stored in memory 334. If there is a match, control unit 332 sends signals to display unit 340 to modify the display to reflect the received new price. Control unit 332 then broadcasts an acknowledge signal (via IR transceiver 338A) to programming device 350 to acknowledge completion of the update. The acknowledge signals (which were received from shelf tags 330) are transmitted in real time from programming device 350 to host computer 312. RF transceiver 358B transmits the acknowledge signals which are to be received by the access points. When host computer 312 receives the acknowledge signal, the respective new price in temporary pricing database 316 is stored in an appropriate field in POS pricing database 314. Thus, the new price becomes the current price for the associated product, and is reflected in customer bills during "check out" at POS terminal 370.

Programming device 350 may also be employed to acquire tag IDs and product IDs for storage in shelf tag database 318. In this regard, scanner 356 of programming device 350 is used to obtain a tag ID, by scanning code display means 342. Scanner 356 is also used to obtain a product ID, by scanning a product identifier, such as a UPC symbol. The product identifier may be printed on a sheet listing various products, or appear on the label associated with the product. Once the tag ID and associated product ID have been scanned and stored in memory 354, programming device 350 transmits the tag ID and product ID to computer workstation 312. In turn, the tag ID and product ID are stored in appropriate data fields of shelf tag database 318.

It will be appreciated that a wireless communications medium, such as IR, has a limited range. As a result, when a programming device 350 broadcasts a tag ID and associated new price for a shelf tag having the matching tag ID, but the shelf tag is outside of receiving range, the pricing update procedure will be unsuccessful. Therefore, according to yet another embodiment of the present invention, programming device 350 may individually broadcast a plurality of stored tag IDs and associated new prices, in an order based on the known position of programming device 350 within a facility (e.g., a retail store). In this regard, a plurality of tag IDs and associated new prices are stored in memory 354. As indicated above, a mapping program (e.g, Plan-O-Gram software) is used to associate each shelf tag 330 with location data, which is indicative of the location of the shelf tag within a facility (e.g., retail store). The location data may be stored at host computer 312 or downloaded to memory 354 of programming device 350. Scanner 356 of programming device 350 establishes the location of programming device 350 based upon the first successful update of a shelf tag. In this respect, programming device 350 begins broadcasting a first tag ID and associated new price. If no acknowledge signal is received, programming device 350 broadcast a another tag ID and new price. Programming device 350 will continue broadcasting each of the various tag IDs and associated new price, until an acknowledge signal is received from a shelf tag 330 indicating a successful pricing update. By knowing the tag ID of the shelf tag that was successfully updated, programing device 350 can establish its location within the facility by referencing the location data. Moreover, the location data allows programming device 350 to broadcast the tag IDs and associated new prices in an order wherein adjacent or nearby shelf tags are updated in sequence. As each shelf tag is updated, programming device 350 continues to reestablish its location based upon the location data. Consequently, the sequence of tag IDs and associated "updated" pricing data which are to be broadcast, can continue to be created or modified based upon the most current location data This allows adjacent or closely located shelf tags to be updated while programming device 350 is in a region nearby.

Methods of operating programmable shelf tag system 300 will now be described with particular reference to FIG. 13, which shows a store configured with programmable shelf tag system 300. Numerous electronic shelf tags 330a–330e and 330' are shown as arranged throughout a store isle. Computer network 310, portable programming device 350, and POS terminals 370 are also illustrated.

In accordance with a batch operation, portable programming device 350 is docked in docking station 322, which is communicatively coupled to computer network 310. Tag IDs and associated new prices are downloaded into memory 354. An operator then walks through the store isles to assure that portable programming device 350 passes within IR communication range of each shelf tag 300 in the store. Programming device 350 broadcasts updates and receives acknowledgments. When all pricing updates are complete, the operator is prompted (e.g., via display unit 362 or an audible alarm) to return programming device 350 to docking station 322 so that the acknowledgments may be uploaded to host computer 312. In response to receiving the acknowledgments, host computer 312 causes the appropriate new prices stored in temporary pricing database 316 to be stored to POS pricing database 314. Thus, the current price in POS pricing database 316 will reflect the new price when customer bills are generated by POS terminals 370.

To further facilitate the foregoing "updating" operation, location data indicating the physical location of each shelf tag is downloaded to portable programming device 350 from the store plan-o-gram mapping database 315. Therefore, as the operator of programming device 350 walks down the store isles, programming device 350 can inform the operator which isles still need to be covered to complete the updating operation. This assures that if there are only few shelf tags remaining for updating, the operator will know where they are located Thus, the operator need not roam the store isles aimlessly during an updating procedure.

It will be appreciated that the present invention provides significant versatility with regard to quick and easy price changes throughout a store. For instance, store management may desire to raise or lower prices during specific daily store hours, or during certain days of a week, month or year. As an example, a 24 hour grocery store may want to raise prices during late night and early morning hours when the only competition are convenience stores, and return to regular prices during daytime hours. Moreover, a store may want to temporarily lower prices during a holiday weekend when competitors are running numerous sales promotions. The present invention allows for an alternate pricing scheme to be implemented in a simple manner, as will be described in detail below.

As indicated above, periodic price changes database 317 includes product IDs, a regular price, an alternate price and an alternate price period. New data may be input to periodic price changes database 317 in the same manner as new data is input into temporary pricing database. When the time approaches for an alternate price to become effective, the alternate price is stored in temporary pricing database 316, and then transferred to the appropriate shelf tag 330. This is carried out in the same manner as described above for updating the shelf tags 330 with new prices stored in temporary pricing database 316. When host computer 312 receives the acknowledge signal indicating that the price displayed by the respective shelf tag has been changed to the alternate price, the alternate price is stored in POS pricing database 314 as the current price. Accordingly, POS terminals 370 will generate customer bills which reflect the alternate price. The same procedure is repeated when it is almost time for the alternate price time period to expire. In this regard, the shelf tags 330 are again updated, and the regular price is again stored in the POS pricing database 314 as the current price.

As indicated above, display unit 340 may display other product information (e.g., a product name or advertising slogan) in addition to the product price. Electronic shelf tag 330' (FIG. 13) illustrates an electronic shelf tag having a display screen for displaying a product name (FIG. 13). The product information is changed in the same manner as prices.

While the foregoing description is set forth the preferred embodiments of the invention with particular detail, it must be understood that numerous modifications, substitutions or changes may be undertaken without departing from the true spirit and scope of the present invention as defined in the following claims.

Having thus described the invention, it is now claimed:

1. An electronic pricing system, comprising:
   a pricing database for storing pricing data and associated product identifiers, said pricing data used by an associated point-of-sale (POS) terminal to generate customer bills;
   a temporary database for storing updated pricing data and associated product identifiers;
   a plurality of electronic shelf tags having display means for displaying a product price for an associated product; and
   a portable programming device for receiving updated pricing data from the temporary database and transmitting the received updated pricing data to the plurality of electronic shelf tags;
   wherein said plurality of electronic shelf tags transmit an acknowledge signal when updated pricing data has been received and said product price displayed by said display means has been modified to reflect the received updated pricing data and said pricing data, in said pricing database corresponding to the product identifier of the updated pricing data associated with the acknowledge signal, is replaced with said updated pricing data.

2. An electronic pricing system according to claim 1, wherein said portable programming device broadcasts said updated pricing data using a wireless communications medium.

3. An electronic pricing system according to claim 2, wherein said wireless communications medium is infrared (IR).

4. An electronic pricing system according to claim 1, wherein said portable programming device broadcasts an associated tag identifier with each updated pricing data, said tag identifier uniquely identifying one of said plurality of electronic shelf tags.

5. An electronic pricing system according to claim 4, wherein each of said plurality of electronic shelf tags responds to said updated pricing data if said associated tag identifier respectively identifies said electronic shelf tag.

6. A method for updating pricing data for a plurality of electronic shelf tags, said method comprising:
 inputting an update file to a computer system, said update file including updated pricing data and associated product identifiers;
 matching said associated product identifiers with shelf tag identifiers stored in said computer system to determine which electronic shelf tags need modification;
 broadcasting pricing information including the updated pricing data and the shelf tag identifiers associated therewith to a portable programming device;
 broadcasting an IR signal from said portable programming device that includes said pricing information, said portable programming device receiving an IR acknowledge signal from an electronic shelf tag in response to the electronic shelf tag modifying a display unit to reflect the updated pricing data;
 broadcasting the received acknowledge signal from said portable programming device to said computer system; and
 upon receipt of the acknowledge signal by the computer system, the computer system updating a point-of-sale pricing database with the updated pricing data for a corresponding product.

7. A method for updating pricing data according to claim 6, wherein said shelf tag identifier and associated product identifier are established by:
 scanning a shelf tag identifier associated with a respective shelf tag, using said programming device;
 scanning a product identifier associated with a respective product, using said programming device; and
 transmitting said shelf tag identifier and associated product identifier to said computer system.

8. A method for updating pricing data according to claim 6, wherein said method further comprises:
 broadcasting pricing information to said electronic shelf tags from said portable programming device, wherein the shelf tag identifier of the electronic shelf tag transmitting an acknowledge signal is communicated to the computer system;
 accessing a mapping database storing shelf tag identifiers and corresponding location data indicative of the location of a respective shelf tag within a facility;
 determining the sequential order of pricing information broadcasts to said electronic shelf tags based upon the location data stored in the mapping database; and
 broadcasting pricing information for electronic shelf tags that are in close proximity to said programming device.

9. A method for updating pricing data for a plurality of electronic shelf tags, said method comprising:
 communicatively coupling a portable programming device to a computer network and downloading tag identifiers and updated pricing data for a plurality of electronic shelf tags;
 broadcasting from the portable programming device the updated pricing data and the tag identifiers associated therewith to the electronic shelf tags located in a facility, by locating the portable programming device within broadcasting range of each of the electronic shelf tags in a facility;
 receiving acknowledgment signals from the electronic shelf tags in response to an electronic shelf tag modifying a respective display unit to reflect the updated pricing data; and
 communicatively coupling a portable programming device to the computer network and uploading acknowledgment signals from the portable programming device to the computer network and upon receipt of the acknowledgment signal by the computer network, the computer network updating a point-of-sale pricing database with the updated pricing data for a corresponding product.

10. A method for updating pricing data according to claim 9, wherein said step of downloading further comprises downloading location data indicative of the location of each electronic shelf tag that needs updated price data.

11. A method for updating pricing data according to claim 10, wherein said portable programming device informs an operator of the location of electronic shelf tags needing to receive updated pricing data.

12. A method for updating pricing data for a plurality of electronic shelf tags, said method comprising:
 broadcasting tag identifiers and updated pricing data from a host computer to a portable programming device in real time, via an RF communication link therebetween;
 broadcasting the updated pricing data and the tag identifiers associated therewith, from the portable programming device to the plurality of electronic shelf tags, wherein the electronic shelf tag identified by the tag identifier modifies a respective display unit to reflect the updated pricing data;
 transmitting acknowledgment signals from the electronic shelf tag to the portable programming device, in response to an electronic shelf tag modifying the respective display unit to reflect the updated pricing data; and
 transmitting said acknowledgment signals from the portable programming device to the host computer in real time, via the RF communication link, and upon receipt of the acknowledgment signal by the host computer, the host computer updating a point-of-sale pricing database with the updated pricing data for a corresponding product.

13. A method for updating pricing data according to claim 12, wherein the broadcast of the updated pricing data and the tag identifiers associated therewith, from the portable programming device to the plurality of electronic shelf tags, and the transmission of acknowledgment signals from the electronic shelf tags to the portable programming device are IR communications.

14. A method for updating pricing data for a plurality of electronic shelf tags, said method comprising:
 inputting an alternate pricing data file to a computer system, said alternate pricing data file including associated product identifiers, current pricing data, alternate pricing data, and alternate price time period data;
 determining a shelf tag identifier associated with each said product identifier by accessing a data file including shelf tag identifiers and associated product identifiers;
 transmitting the alternate pricing data and associated shelf tag identifier to a portable programming device, the transmission to the portable programming device occurring at a time in accordance with the alternate price time period data associated with the alternate pricing data;

broadcasting the alternate pricing data and the associated shelf tag identifier, from the portable programming device to the plurality of electronic shelf tags, said portable programming device receiving an acknowledge signal from an electronic shelf tag in response to the electronic shelf tag modifying a respective display unit to reflect the alternate pricing data;

broadcasting the received acknowledge signal from said portable programming device to said computer system; and upon receipt of the acknowledge signal by the computer system, the computer system updating a point-of-sale pricing database with the alternate pricing data for a product identifier associated with the acknowledge signal.

15. A method for updating pricing data according to claim 14, wherein said method further comprises:

updating the point-of-sale database with the current pricing data for a product identifier when the respective alternate price time period data indicates that an alternate price time period has expired.

* * * * *